United States Patent Office 2,798,000
Patented July 2, 1957

2,798,000

PRINTING INK WITH ANTI-SKINNING AGENT

William A. Monterman, Cicero, Ill., assignor to International Minerals & Chemical Corporation, a corporation of New York No Drawing. Application December 16, 1952,
Serial No. 326,361

10 Claims. (Cl. 106—24)

The invention relates to improved compositions employed in printing. More particularly, it relates to novel additives for printing inks.

Printing inks are generally a combination of oils, varnishes, pigments, and driers. Often compounds consisting of various combinations of waxes, soaps, greases, and oils are added to printing inks in order to improve working and setting qualities of the printing ink and to minimize such difficulties as sticking and picking. For many years there have been efforts to discover effective anti-skinning agents which can be added to printing inks in order to retard skinning of the ink in the fountains and on the rollers. It is known that certain polyhydroxy phenols such as hydroquinone, pyrocatechol and pyrogallol are anti-skinning agents in other types of compositions, for example in photographic materials, but the cost of these compounds is prohibitive, and it proved difficult to properly incorporate these compounds into printing inks. Guaiacol, a monomethyl ether derivative of pyrocatechol which is relatively inexpensive, when used as an additive in printing compositions was only partially effective and discolored the white and light colored inks. No satisfactory anti-skinning agent for printing inks has heretofore been used.

It is an object of the instant invention to provide improved printing inks.

It is a further object of the instant invention to provide an improved anti-skinning agent for printing ink compositions.

It is a further object of the instant invention to provide printing inks which are quick drying, remain soft and pliable on the rollers, and which simplify the cleaning and maintenance of printing machinery.

It is a further object of the instant invention to provide improved printing inks which produce printed matter of high quality with economy.

It is a further object of the instant invention to provide printing inks which prolong the life of the printing plates employed, i. e., the number of printed copies per plate.

These and other objects of the instant invention will become more apparent upon a fuller understanding of the invention as herein set forth.

It has been discovered that by incorporating into printing ink a small amount of an amino acid-containing solution, such as a proteinaceous hydrolysate or a fraction of a proteinaceous hydrolysate or a solution containing at least six of the amino acids which are normally present in hydrolysates of proteins, the ink has improved characteristics. By the term "fraction of a proteinaceous hydrolysate" as used herein is meant protein hydrolysates from which substantial amounts of one or more of the amino acids initially present have been separated. For example, a hydrolysate fraction resulting from the removal of substantial amounts of tyrosine and/or glutamic acid from a protein hydrolysate is mixed with printing ink. The protein hydrolysate or the fraction of a protein hydrolysate is generally adjusted to a pH between about 5 and about 7.5, preferably about 5.5 to about 6.5 and is added to the printing ink.

The amino acid-containing solution which is used in accordance with the instant invention may be produced by hydrolyzing any protein, such as wheat gluten, corn gluten, zein, soybean meal, linseed meal, blood meal, casein, flaxseed meal, and the like. A hydrolysate of protein or a protein hydrolysate fraction resulting after separation of substantial amounts of one or more amino acids therefrom, may be added to the printing inks. In another embodiment, the amino acid-containing solution is prepared by combining into a synthetic mixture at least six of the amino acids which are constituents of natural protein hydrolysates.

Generally, in practicing the instant invention, sufficient amino acid-containing solution is added to the ink to produce an ink which contains between about 0.4% by weight and about 2.5% by weight of amino acids. An ink of medium body generally contains between about 0.7% by weight and about 1.2% by weight, preferably about 1.0% by weight of amino acids. A smaller amount of amino acid-containing solution is generally employed for lighter bodied inks than for the medium bodied inks. For example, between about 0.4% by weight and about 0.9% by weight of amino acids are added. A greater percentage by weight of amino acids is used in heavier bodied inks than in the medium bodied inks. For example, generally between about 1.1% by weight and about 2.2% by weight of amino acids is employed. The volume of the amino acid-containing solution added to the printing ink of course depends upon the concentration of the amino acids in the solution.

In one specific embodiment of the instant invention, a protein such as a gluten is hydrolyzed in a conventional manner, for example, with a mineral acid, non-oxidizing under the conditions obtaining, and the pH of the hydrolysate is adjusted with alkali to between about 5 and about 6.5. The adjusted hydrolysate generally contains between about 10% by weight and about 15% by weight of amino acid solids. The hydrolysate is concentrated to between about 30% and about 40% amino acid solids content. Impurities are separated, for example by filtration. Between about 1.5% by weight and about 6.5% by weight, preferably about 5% by weight of the adjusted concentrated hydrolysate is added to printing ink formulae.

In another embodiment of the instant invention about 5% by weight of a protein hydrolysate fraction is admixed with a one pound can of offset ink. An approximate analysis of a typical protein hydrolysate fraction produced in a conventional process for the production of glutamic acid as taught in U. S. Patent No. 2,463,877 is as follows:

| | Percent |
|---|---|
| Arginine | 1.90 |
| Aspartic acid | 1.10 |
| Cystine | 0.24 |
| Glutamic acid | 3.20 |
| Histidine | 0.23 |
| Isoleucine | 1.60 |
| Leucine | 1.00 |
| Lysine | 0.79 |
| Methionine | 0.31 |
| Phenylalanine | 2.40 |
| Threonine | 0.41 |
| Tyrosine | 0.49 |
| Valine | 2.40 |
| Other amino acids | 23.93 |
| Total amino acid content | 39.97 |

In a preferred embodiment the protein hydrolysate fraction added to the ink contains all or a majority of the above constituents and has an analysis substantially as above, or similar to the above, however, the fraction may be obtained from other amino acid recovery processes.

In another specific embodiment, about 5% by weight of an amino acid-containing solution is mixed with printing ink. The amino acid solution is synthetically prepared by combining twelve or thirteen of the individual amino acids which occur naturally in protein hydrolysate fractions, in about the same relative amounts as they naturally occur in protein hydrolysates or in hydrolysate fractions, or they may be combined in about equal amounts of each of the amino acids. For example, glutamic acid, lysine, histidine, tryptophane, proline, valine, glycine, leucine, isoleucine, methionine, cystine, tyrosine and phenylalanine are dissolved in about equal amounts.

In another specific embodiment of the instant invention, a sufficient amount of a protein hydrolysate fraction is mixed with lithographic black ink so that the ink contains between about 1.5% by weight and about 2.5% by weight of total amino acids. The protein fraction has an analysis substantially the same as the one previously set forth, and has an adjusted pH of between about 5.0 and about 6.5. A typical black lithographic ink is prepared from the following ingredients:

54 lbs. 8 oz. #3 lithograph varnish
4 lbs. 8 oz. concentrated cobalt linoleate drier
9 lbs. 0 oz. alkali reflex blue tones
0 lbs. 4 oz. offset ink compound
31 lbs. 12 oz. high-grade carbon black
5 lbs. aqueous hydrolysate fraction (39% amino acids) produced by hydrochloric acid hydrolysis of wheat gluten and removal of substantial amounts of glutamic acid, tyrosine and leucine.

In another specific embodiment a sufficient amount of a hydrolysate fraction is mixed with a blue offset ink to obtain ink containing between about 1.5% by weight and about 2.5% by weight of total amino acids. A typical blue offset ink is a combination of the following:

4 lbs. 8 oz. #00 lithographic varnish
32 lbs. 0 oz. #1 lithographic varnish
4 lbs. 0 oz. alumina hydrate, dry
4 lbs. 0 oz. blanc fixe, dry
49 lbs. 0 oz. Milori blue, dry
4 lbs. 4 oz. refined wool grease
2 lbs. 4 oz. offset ink compound
5 lbs. protein hydrolysate fraction (39% amino acid aqueous solution) produced by hydrochloric acid hydrolysis of wheat gluten and removal of substantial amounts of glutamic acid, tyrosine and leucine.

When the offset inks are treated with an amino acid-containing solution in accordance with the instant invention, about 45,000 copies of a print are obtained before fading begins. On the other hand, under comparable conditions and with conventional offset inks fading begins after about 15,000 to 18,000 copies have been printed.

One of the qualities of the printing ink prepared in accordance with the instant invention is softness. This softness or pliableness has several advantages, one of which is that less printing ink is used to cover a given area of printed surface. The regulating of the flow of ink is also much easier. When the amino acid-containing solution is mixed with ink it gives less expensive inks the quality of good bond ink. When the said solution is added to inks having an oil base, the ink will dry quickly. There is no wasting of ink due to skin formation in the cans of ink or in the ink fountains.

When the amino acid-containing solution is used in printing inks, the presses need not be cleaned after use each time. The printing machines can stand for many days and then be started again. The presses are as easily washed after prolonged standing as if they were washed immediately after use. Time required for maintenance to keep presses in condition for running is cut to a minimum. When the instant amino acid-containing solution is employed, the metal plates give clearer impressions for at least about double the number of prints that could be obtained in normal operations without use of the instant type of ink composition.

The amino acid-containing solutions can be added to any printing ink, such as offset inks, multigraph inks, lithograph inks, letter press inks, newsprint inks, and the like.

Having thus fully described and illustrated the character of the invention, what is desired to be secured and claimed by Letters Patent is:

1. A printing composition comprising a printing ink ordinarily subject to skin formation and containing a sufficient amount of at least six of the amino acids which occur naturally in protein hydrolysates to produce an ink of soft texture.

2. A printing composition comprising a printing ink ordinarily subject to skin formation and containing at least six amino acids which occur naturally in protein hydrolysates totaling between about 0.4% by weight and about 2.6% by weight of the composition and having a pH of between about 5.0 and about 7.5.

3. A printing composition comprising a printing ink ordinarily subject to skin formation and containing at least six of the amino acids which naturally occur in protein hydrolysates and totaling between about 0.4% by weight and about 2.6% by weight of the composition.

4. A printing composition comprising a printing ink ordinarily subject to skin formation and containing between about 0.4% by weight and about 2.6% by weight of the amino acids which occur in protein hydrolysate fractions and having a pH of between about 5.0 and about 7.5.

5. A process which comprises adding a sufficient amount of at least six amino acids, which normally occur in protein hydrolysates to printing ink ordinarily subject to skin formation, to impart softness to the ink.

6. A process which comprises adding a sufficient amount of at least six of the amino acids which occur in protein hydrolysates to a printing ink selected from the group consisting of offset ink, letter press ink, lithograph ink, multigraph ink, and newsprint ink to impart softness to the ink.

7. A process which comprises admixing with printing ink ordinarily subject to skin formation, between about 0.4% by weight and about 2.6% by weight of at least six of the amino acids which occur in protein hydrolysates and having a pH of between about 5.0 and about 7.5.

8. A process which comprises admixing with printing ing ordinarily subject to skin formation, between about 0.4% by weight and about 2.6% by weight of at least ten of the amino acids which occur in protein hydrolysates said printing ink selected from the group consisting of offset ink, letter press ink, lithograph ink, multigraph ink, and newsprint ink.

9. A process which comprises admixing with printing ink ordinarily subject to skin formation, a sufficient amount of a solution selected from the group consisting of a hydrolysate of protein and a protein hydrolysate fraction, to produce ink containing between about 0.4% by weight and about 2.6% by weight of amino acids and having a pH of between about 5.0 and about 7.5.

10. A process which comprises admixing with a printing ink ordinarily subject to skin formation and selected from the group consisting of offset ink, letter press ink, lithograph ink, multigraph ink, and newsprint ink, a sufficient amount of a solution selected from the group consisting of protein hydrolysates and protein hydrolysate fractions, to produce an ink containing between about 0.4% by weight and about 2.6% by weight of amino acids.

(References on following page)

References Cited in the file of this patent

UNITED STATES PATENTS

| | | |
|---|---|---|
| 1,429,338 | Glass | Sept. 19, 1922 |
| 1,962,823 | Kurz et al. | June 12, 1934 |
| 2,153,130 | Baxter | Apr. 4, 1939 |
| 2,234,183 | Lofgren | Mar. 11, 1941 |
| 2,468,633 | Lauderman | Apr. 26, 1949 |
| 2,482,879 | Schmutzler | Sept. 27, 1949 |
| 2,556,902 | Chambers et al. | June 12, 1951 |

FOREIGN PATENTS

| | | |
|---|---|---|
| 471,827 | Great Britain | Sept. 13, 1937 |
| 528,720 | France | Nov. 18, 1921 |

OTHER REFERENCES

Wolfe: "Printing and Litho. Inks," pub. by MacNair-Dorland (1949), pages 55–68 relied on.